United States Patent
Chen et al.

(10) Patent No.: US 9,263,940 B2
(45) Date of Patent: Feb. 16, 2016

(54) POWER CONVERTER AND POWER FACTOR CORRECTOR THEREOF

(71) Applicant: RICHTEK TECHNOLOGY CORP., Hsinchu County (TW)

(72) Inventors: Chien-Hung Chen, Hsinchu (TW); Isaac Y. Chen, Hsinchu County (TW); Yi-Wei Lee, Taipei (TW); Jyun-Che Ho, Chiayi County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 154 days.

(21) Appl. No.: 14/075,717

(22) Filed: Nov. 8, 2013

(65) Prior Publication Data

US 2014/0340949 A1   Nov. 20, 2014

(30) Foreign Application Priority Data

May 20, 2013   (TW) .............................. 102117762 A

(51) Int. Cl.
*H02M 3/335* (2006.01)
*H02M 1/42* (2007.01)

(52) U.S. Cl.
CPC .................................. *H02M 1/4225* (2013.01)

(58) Field of Classification Search
CPC ... H02M 3/156; H02M 1/4225; H02M 3/158; H02M 3/3376; Y02B 70/126
USPC ......... 323/207, 224, 242, 259, 266, 282–290; 363/16–20, 44, 81, 89, 21.12
See application file for complete search history.

(56) References Cited

U.S. PATENT DOCUMENTS

| | | | | |
|---|---|---|---|---|
| 5,909,362 A | * | 6/1999 | Adams .............. | H02M 3/33569 363/21.03 |
| 6,307,361 B1 | * | 10/2001 | Yaakov ............... | H02M 1/4225 323/284 |
| 6,946,819 B2 | * | 9/2005 | Fagnani et al. ............... | 323/207 |
| 7,391,631 B2 | * | 6/2008 | Shimada ......................... | 363/89 |
| 7,616,454 B2 | * | 11/2009 | Yang ................. | H02M 3/33507 323/242 |
| 7,723,964 B2 | * | 5/2010 | Taguchi ....................... | 323/222 |

(Continued)

FOREIGN PATENT DOCUMENTS

| | | |
|---|---|---|
| CN | 103066831 A | 4/2013 |
| TW | 201222191 A | 6/2012 |
| TW | 201250430 A | 12/2012 |

OTHER PUBLICATIONS

International Search Report dated Nov. 20, 2014, issued by the Taiwan Patent Office in related Taiwan Patent Application No. TW 102117762, with English translation (2 pages).

*Primary Examiner* — Rajnikant Patel
(74) *Attorney, Agent, or Firm* — Osha Liang LLP

(57) ABSTRACT

A power converter includes a rectifier and a power factor corrector. The rectifier is to be coupled to an alternating current power source and is configured to output a rectified signal. The power factor corrector includes a correcting circuit and a control circuit. The correcting circuit receives the rectified signal and is configured to generate an output voltage based on the rectified signal and a driving signal. The control circuit is configured to generate a first to-be-compared signal based on the rectified signal, to generate a second to-be-compared signal based on the output voltage, to compare the first and second to-be-compared signals, and to generate the driving signal based on a result of comparison performed thereby.

18 Claims, 10 Drawing Sheets

(56) References Cited

U.S. PATENT DOCUMENTS

| | | | | |
|---|---|---|---|---|
| 7,723,967 B2* | 5/2010 | Bernardon | | 323/266 |
| 8,582,319 B2* | 11/2013 | Reinberger | | H02M 3/3376 323/207 |
| 8,867,237 B2* | 10/2014 | Desimone | | H02M 1/44 363/21.05 |
| 2012/0069611 A1 | 3/2012 | Yang et al. | | |
| 2012/0306459 A1 | 12/2012 | Ho et al. | | |
| 2013/0147452 A1 | 6/2013 | Yang et al. | | |

* cited by examiner

POWER CONVERTER AND POWER FACTOR CORRECTOR THEREOF

CROSS-REFERENCE TO RELATED APPLICATION

This application claims priority of Taiwanese Application No. 102117762, filed on May 20, 2013.

BACKGROUND OF THE INVENTION

1. Field of the Invention

The invention relates to a power converter, more particularly to a power converter that is implemented with power factor correction capabilities.

2. Description of the Related Art

Typically, a conventional power converter includes a bridge rectifier disposed to receive an alternating current (AC) power signal for outputting a rectified signal, and a power factor corrector (PFC) coupled to the bridge rectifier. The effect of the PFC is to address unwanted harmonic distortion resulting from non-linear characteristics of the bridge rectifier, thereby minimizing the adverse effect of the harmonic distortion on a power factor of the power converter.

FIG. 1 illustrates an exemplary PFC using an average-current-mode control configuration. In operation, a divided rectified voltage ($V_{rec2}$) is fed to a computing circuit 91 for obtaining a first value based on a square of root-mean-square (RMS) value of the divided rectified voltage ($V_{rec2}$). The computing circuit 91 is also configured to obtain a second value by multiplying the voltage $V_{EAO}$ and the current ($I_{AC}$), and to obtain a third value through dividing the second value by the first value. The third value is then used to control switching of a transistor (Q) between conducting and non-conducting states. As a result, a current ($I_L$) flowing through an inductor (L) can be modified to have a phase that tracks that of voltage ($V_{rec1}$), thereby reducing the harmonic distortion and increasing the power factor of the power converter.

However, implementation of the computing circuit 91 may be relatively burdensome, due to the complexity of the circuits needed for the arithmetic operations, and the number of arithmetic operations involved. Additionally, it is required that the computing circuit 91 have a high linearity, in order to ensure proper handling of signals in various frequency bands.

It is also known that, after being modified by the PFC in FIG. 1, the current ($I_L$) flowing through the inductor (L) may end up having a sawtooth waveform (e.g., as shown by the broken lines in FIG. 2). While the sawtooth waveform may be filtered out using a low-pass filter disposed between the resistors ($R_s$) and ($R_{M1}$) (not shown in the drawings), the presence of the low-pass filter introduces a phase delay on a non-inverting input terminal of an amplifier 95, which may offset the effect of the PFC.

SUMMARY OF THE INVENTION

Therefore, the object of the present invention is to provide a power converter that is able to alleviate the above drawbacks of the conventional power converter.

Accordingly, a power converter of the present invention comprises a rectifier and a power factor corrector (PFC).

The rectifier is to be coupled to an alternating current (AC) power source, and is configured to output a rectified signal.

The PFC includes a correcting circuit and a control circuit.

The correcting circuit is coupled to the rectifier for receiving the rectified signal therefrom, and is configured to generate an output voltage based on the rectified signal and a driving signal. The correcting circuit includes an inductor, and current flowing from the rectifier flows through the inductor. The correcting circuit further includes a transistor that is controlled by the driving signal to switch between conducting and non-conducting states to control in turn energy storing and energy discharging by the inductor.

The control circuit is configured to: generate a first to-be-compared signal based on the rectified signal, generate a second to-be-compared signal based on the output voltage, compare the first and second to-be-compared signals, and generate the driving signal based on a result of comparison performed thereby.

Another object of the present invention is to provide the power factor corrector (PFC) which can be used with a rectifier that outputs a rectified signal.

Accordingly, a PFC of the present invention comprises a correcting circuit and a control circuit.

The correcting circuit is coupled to the rectifier for receiving the rectified signal therefrom, and is configured to generate an output voltage based on the rectified signal and a driving signal. The correcting circuit includes an inductor, and current flowing from the rectifier flows through the inductor. The correcting circuit further includes a transistor that is controlled by the driving signal to switch between conducting and non-conducting states to control in turn energy storing and energy discharging by the inductor.

The control circuit is configured to: generate a first to-be-compared signal based on the rectified signal, generate a second to-be-compared signal based on the output voltage, compare the first and second to-be-compared signals, and generate the driving signal based on a result of comparison performed thereby.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
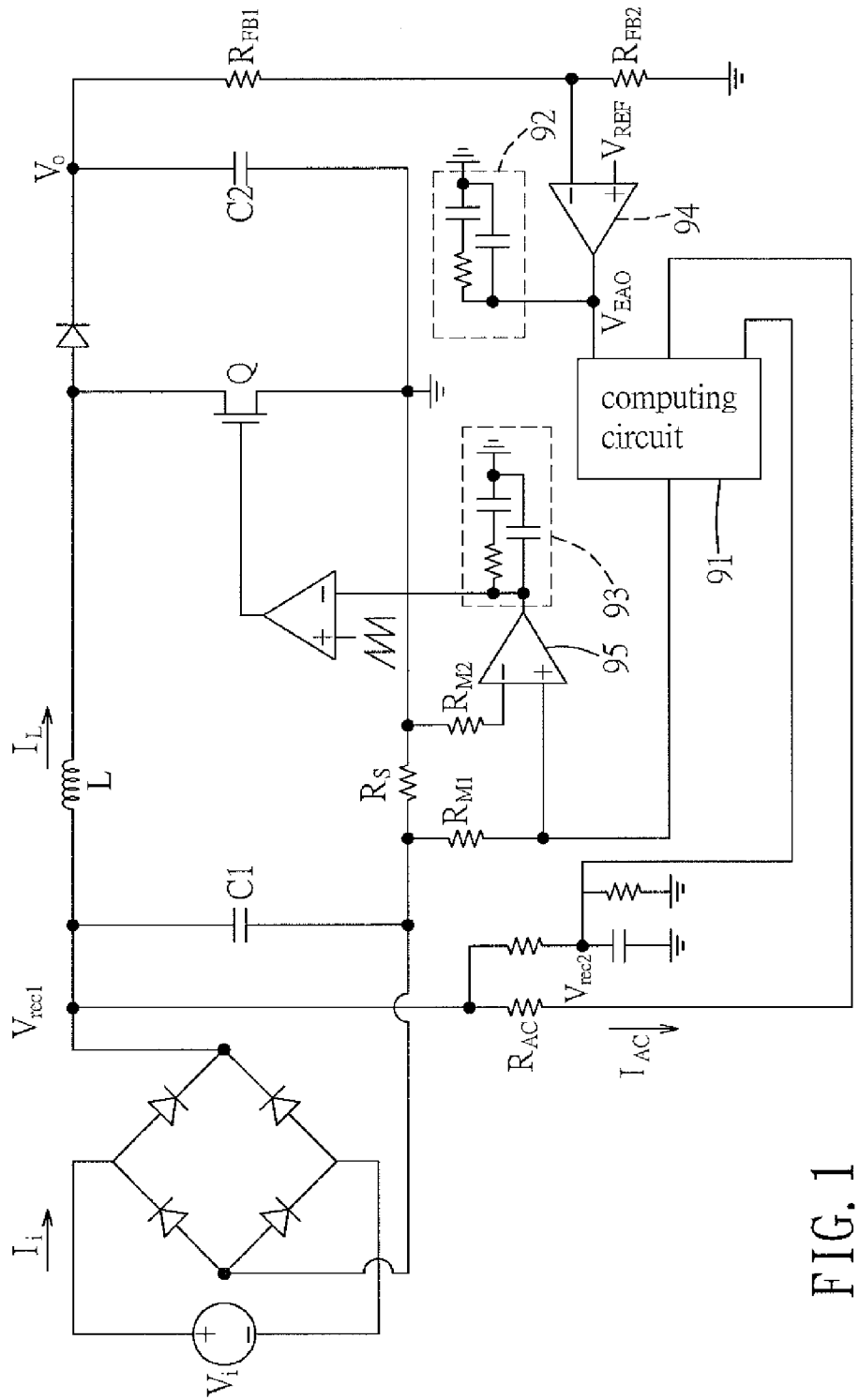
FIG. 1 is a circuit diagram of a conventional power converter.
Figure 2:
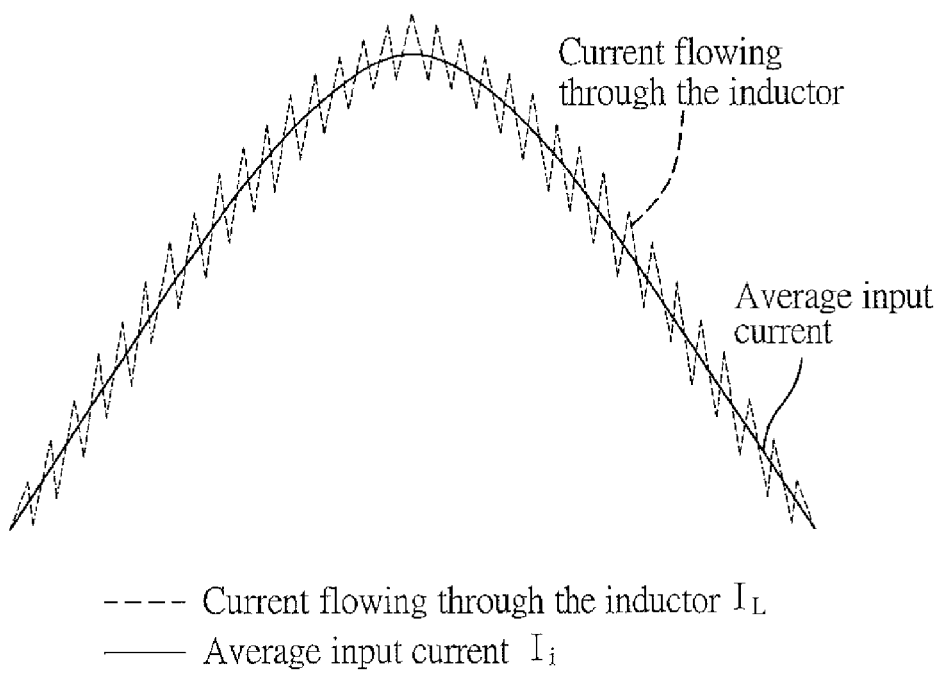
FIG. 2 illustrates a relationship between current outputted by a rectifier and current flowing through an inductor of the conventional power converter.

Before the present invention is described in greater detail, it should be noted that like elements are denoted by the same reference numerals throughout the disclosure.

Figure 3:
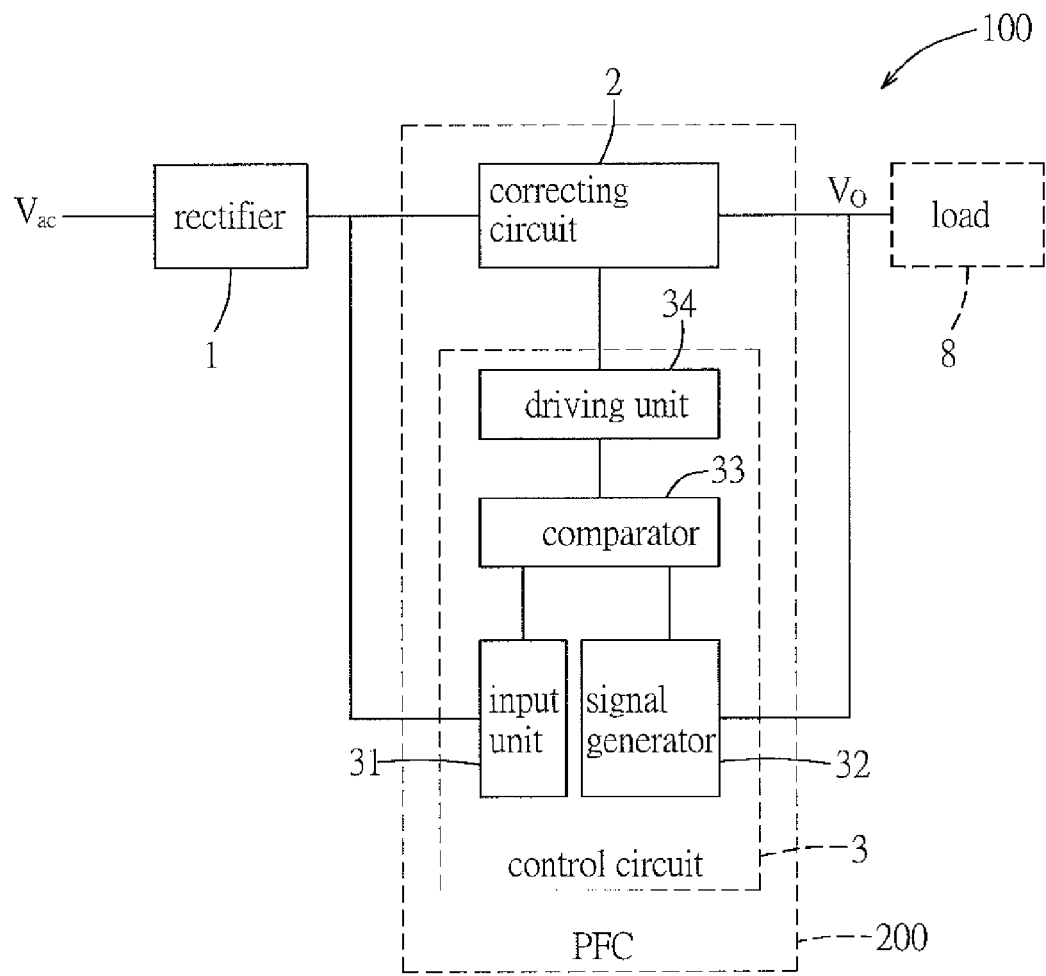
FIG. 3 is a schematic block diagram of a first preferred embodiment of a power converter according to the invention.
Figure 4:
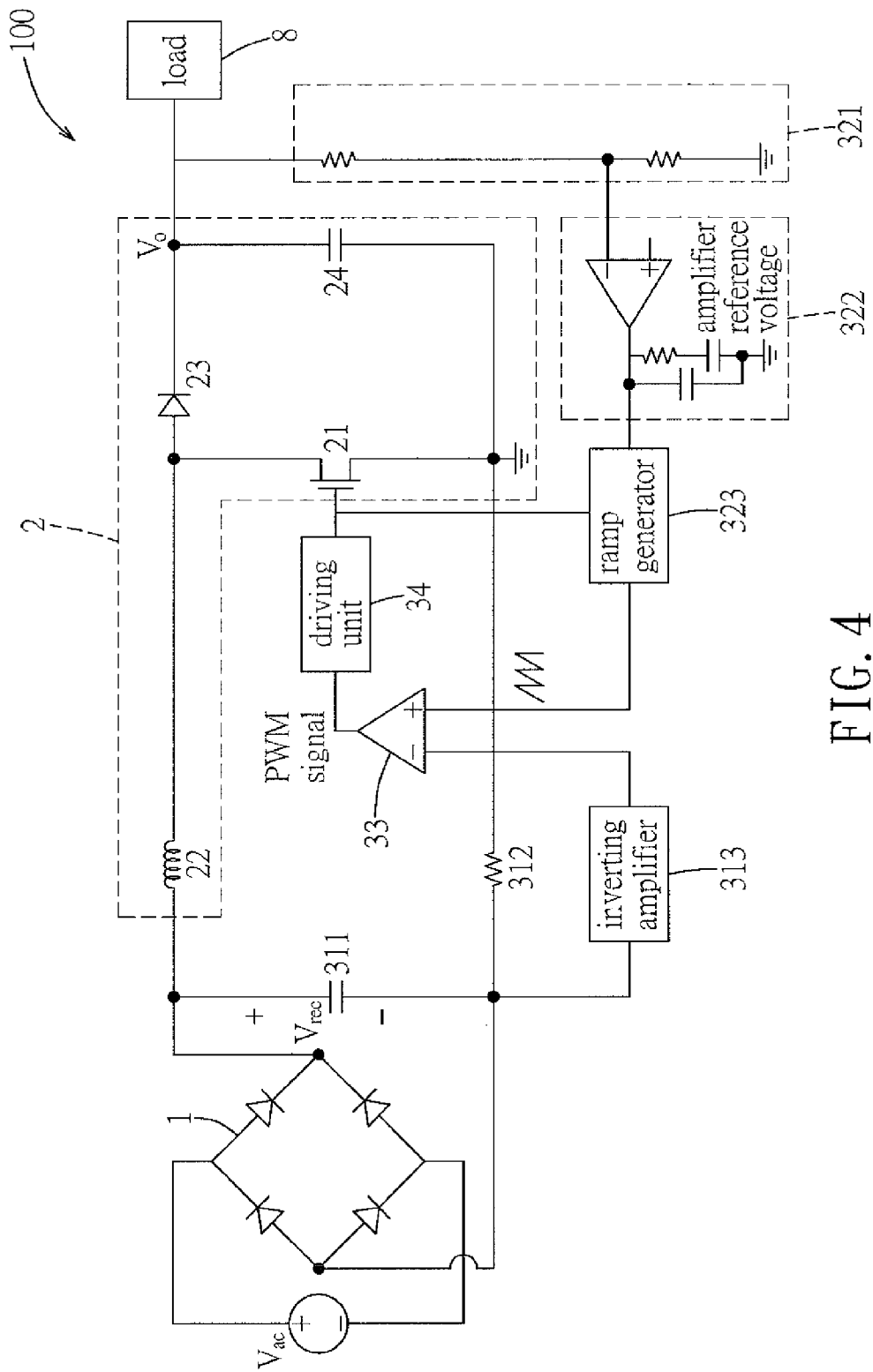
FIG. 4 is a circuit diagram of the power converter according to the first preferred embodiment.

As shown in FIGS. 3 and 4, the first preferred embodiment of a power converter 100 according to the present invention is to be coupled to an alternating current (AC) power source ($V_{ac}$), and is configured to output an output voltage ($V_o$) to a load 8. The power converter 100 comprises a rectifier 1 and a power factor corrector (PFC) 200 coupled to the rectifier 1. The PFC 200 includes a correcting circuit 2 and a control circuit 3.

The rectifier 1 is disposed to receive an AC power signal from the AC power source ($V_{ac}$), and includes first and second output terminals, which output therebetween a rectified signal ($V_{rec}$) generated by the rectifier 1.

The correcting circuit 2 is coupled to the rectifier 1 for receiving the rectified signal ($V_{rec}$) therefrom, and is configured to generate the output voltage ($V_o$) based on the rectified signal ($V_{rec}$) and a driving signal, which is generated by the control circuit 3 and will be described in the succeeding paragraphs.

The detailed structure of the correcting circuit 2 will now be described. The correcting circuit 2 includes a transistor 21, an inductor 22, a diode 23 and a capacitor 24.

The inductor 22 has an end coupled to the first output terminal of the rectifier 1, such that current flowing from the rectifier 1 flows through the inductor 22. The diode 23 has an anode coupled to the other end of the inductor 22, and a cathode coupled to the load 8. The capacitor 24 is coupled between the cathode of the diode 23 and ground. The transistor 21 has a control terminal disposed to receive the driving signal, a first terminal coupled to the anode of the diode 23, and a second end that is grounded. The transistor 21 is controlled by the driving signal to switch between conducting and non-conducting states, and to control in turn energy storing and energy discharging by the inductor 22.

Specifically, when the transistor 21 is conducting, the current flowing through the inductor 22 is based on the rectified signal ($V_{rec}$). Subsequently, energy is stored in the inductor 22. On the other hand, when the transistor 21 is not conducting, energy stored in the inductor 22 is discharged to the capacitor 24 and the load 8.

The detailed structure of the control circuit 3 will now be described. The control circuit 3 includes an input unit 31, a signal generator 32, a comparator 33, and a driving unit 34.

The input unit 31 is coupled to the rectifier 1, and is configured to generate a first to-be-compared signal based on the rectified signal ($V_{rec}$). The signal generator 32 is disposed to receive the output voltage ($V_o$), and is configured to generate a second to-be-compared signal based on the output voltage ($V_o$).

The comparator 33 is coupled to the input unit 31 and the signal generator 32, and is configured to compare the first and second to-be-compared signals, and to generate a comparison result. The driving unit 34 is disposed to receive the comparison result, and is configured to generate the driving signal, which is to be provided to the control terminal of the transistor 21, which is in a form of a pulse. Thus, the comparison result may be considered as a pulse width modulation (PWM) signal that affects a duty cycle of the driving signal.

In this embodiment, the input unit 31 includes an input capacitor 311, a resistor 312 and an inverting amplifier 313. The input capacitor 311 is coupled across the first and second output terminals of the rectifier 1. The resistor 312 has one end coupled to the second output terminal of the rectifier 1, and another end that is grounded. The inverted amplifier 313 is disposed to receive the voltage of the second output terminal at the rectifier 1 (i.e., the voltage across the resistor 312), and to output the first to-be-compared signal by amplifying the voltage across the resistor 312 by (−A) times (i.e., (A) is known as a "gain" of the inverted amplifier 313). In this embodiment, the gain (A) is equal to 1, and the first to-be-compared signal is thus the voltage across the resistor 312 but with a negative sign.

The signal generator 32 includes a voltage divider 321, an error amplifier 322, and a ramp generator 323. The voltage divider 321 is configured to output a divided output voltage, which is divided from the output voltage (Vo). The error amplifier 322 is configured to compare the divided output voltage with an amplifier reference voltage and to generate an amplifier output signal according to a result of comparison performed thereby. The ramp generator 323 is configured to generate a ramp signal that serves as the second to-be-compared signal, based on the amplifier output signal and the driving signal. Particularly, a voltage level of the amplifier output signal determines a slope of the ramp thus generated, while a voltage level of the driving signal determines whether the ramp voltage is rising or falling.

In this embodiment, the comparison result (i.e., the PWM signal) outputted by the comparator 33 has a low logic level when the voltage of the first to-be-compared signal is higher than that of the second to-be-compared signal. The comparison result outputted by the comparator 33 has a high logic level when the voltage of the first to-be-compared signal is not higher than that of the second to-be-compared signal. A rising edge of the driving signal is determined with reference to the comparison result from the comparator 33. A falling edge of the driving signal may be determined with reference to, for example, a clock signal.

The driving signal is then provided to the control terminal of the transistor 21, as shown in FIG. 4, for controlling the transistor 21. It will be appreciated by those skilled in art that a duty cycle of the driving signal is positively related to the resulting output voltage ($V_o$). For example, a smaller duty cycle renders conduction time of the transistor 21 to be shorter, and in turn the inductor 22 spends less time storing energy therein. The result is a lower output voltage ($V_o$). On the other hand, a larger duty cycle increases the output voltage ($V_o$). With such a configuration, when a drift of the AC power source ($V_{ac}$) and/or the load 8 occurs, the control circuit 3 is able to accordingly adjust the duty cycle of the driving signal, in order to provide a stable output voltage ($V_o$) with a high power factor.

Figure 5:
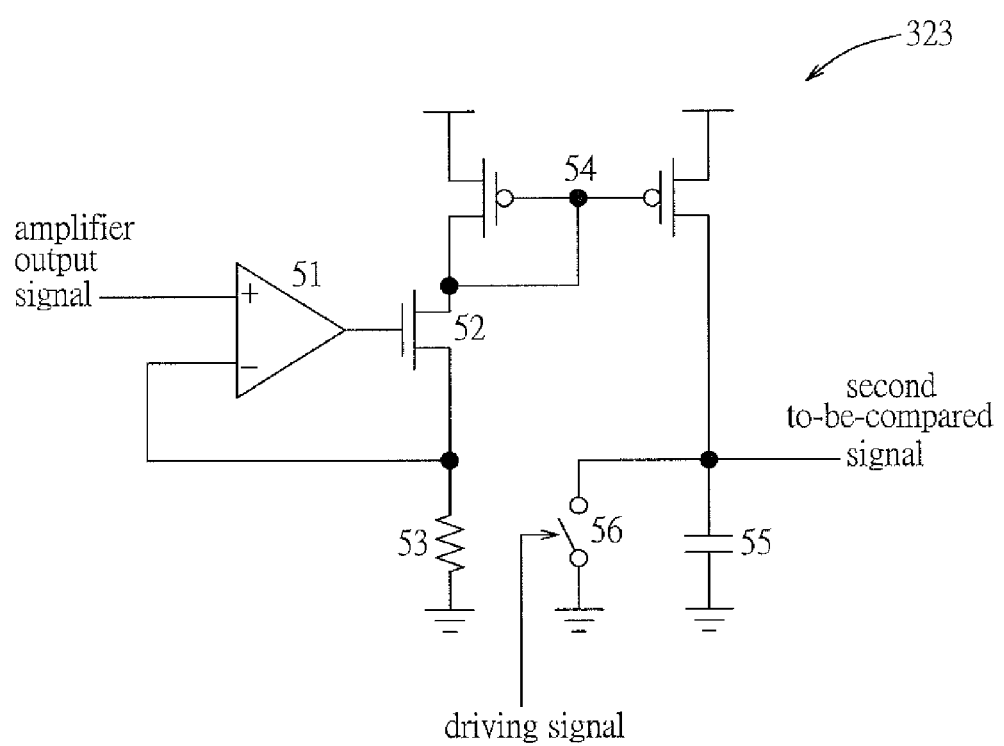
FIG. 5 is a circuit diagram of a ramp generator according to the first preferred embodiment.

The detailed structure of the ramp generator 323 will now be described with reference to FIG. 5. The ramp generator 323 includes an operational amplifier (OP-AMP) 51, a transistor 52, a resistor 53, a current mirror 54, a capacitor 55, and a switch 56.

The OP-AMP 51 has an inverting input terminal, a non-inverting input terminal that is disposed to receive the amplifier output signal, and an output terminal. The transistor 52 has a control terminal coupled to the output terminal of the OP-AMP 51, a first terminal, and a second terminal coupled to the inverting input terminal of the OP-AMP 51. The resistor 53 has one end coupled to the inverting input terminal of the OP-AMP 51 and the second terminal of the transistor 52. The current mirror 54 has an input terminal coupled to the first terminal of the transistor 52, and an output terminal. The capacitor 55 is coupled to the output terminal of the current mirror 54. A voltage across the capacitor 55 serves as the second to-be-compared signal. The switch 56 is coupled across the capacitor 55, and is controlled by the driving signal to switch between open and closed states. Specifically, the switch 56 is configured to open when the driving signal is at the low logic level, and to close when the driving signal is at the high logic level.

In operation, the OP-AMP 51 is configured to control conduction of the transistor 52 according to the amplifier output signal, which is generated according to the output voltage ($V_o$). When the transistor 52 conducts, the current mirror 54 is configured to provide a mirrored current corresponding to a current at the input terminal thereof.

Figure 6:
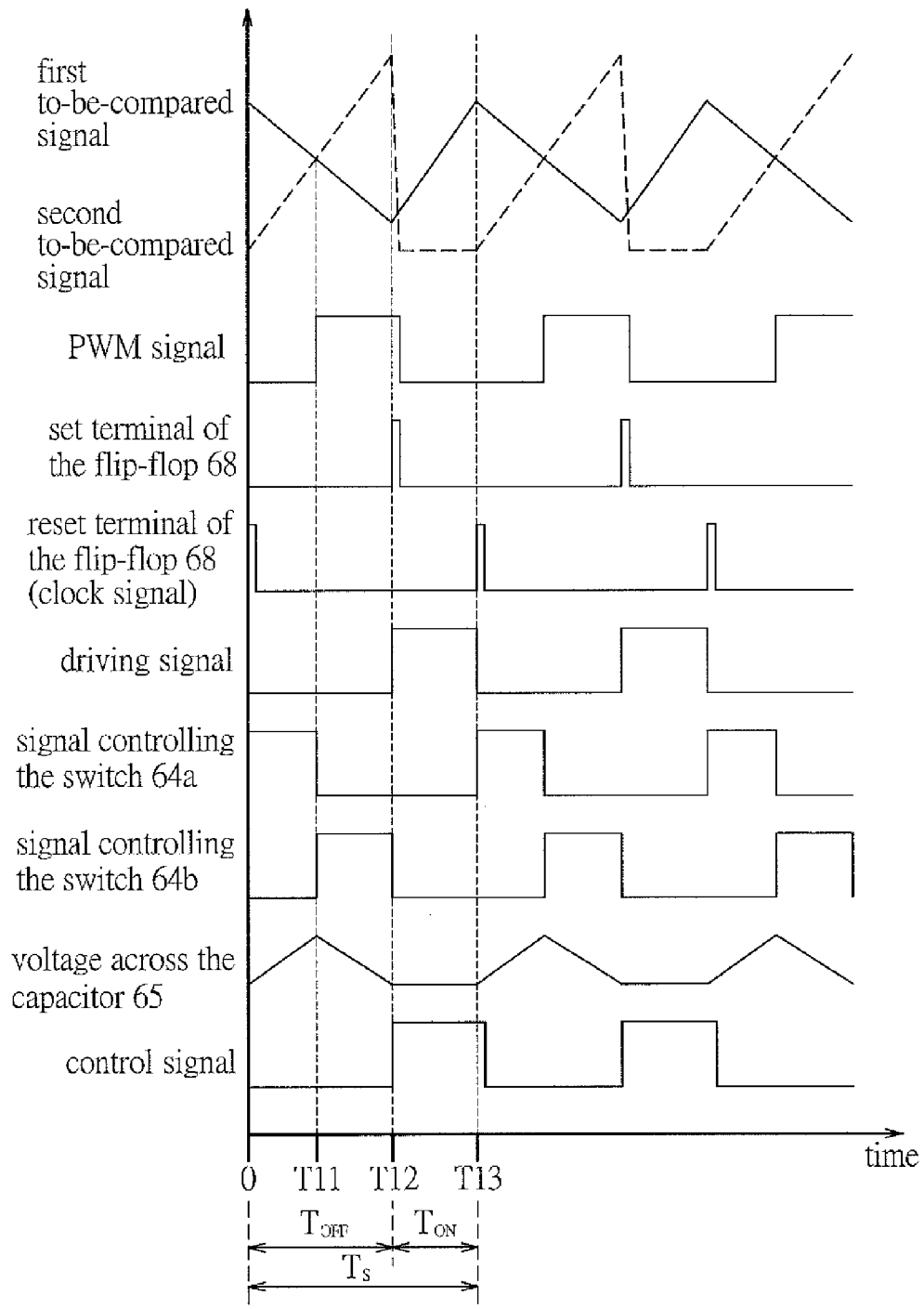
FIG. 6 is a timing diagram illustrating states of various signals within the power converter, according to the first preferred embodiment.

Further referring to FIG. 6, when the switch 56 is open, charging of the capacitor 55 by the mirrored current is enabled. This results in an increase of the voltage across the capacitor 55 (i.e., the second to-be-compared signal), as shown in FIG. 6, e.g., during the period ($T_{off}$). On the other hand, when the switch 56 is closed, discharging of the capacitor 55 is enabled, resulting in a drop of the second to-be-compared signal, as shown in FIG. 6, e.g., during the period ($T_{on}$).

Figure 7:
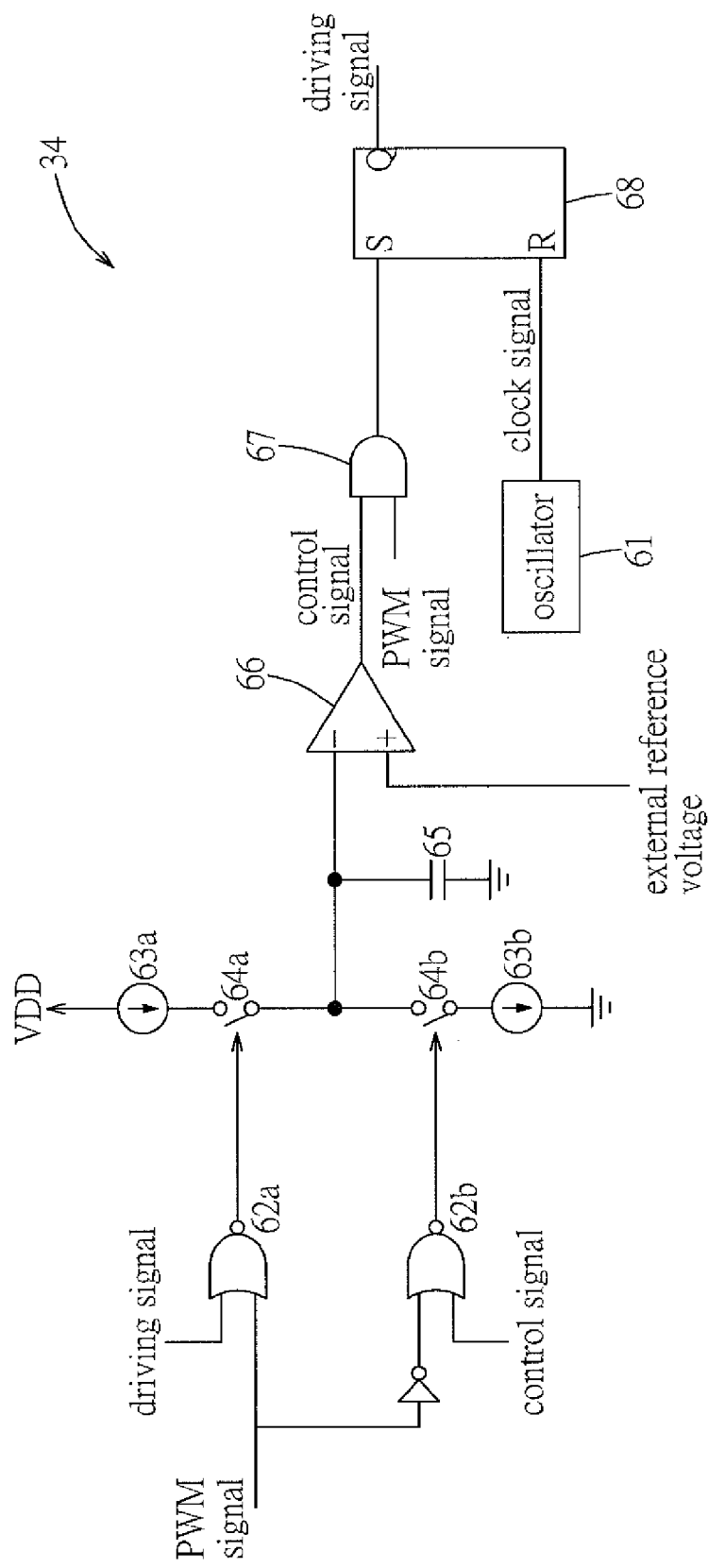
FIG. 7 is a circuit diagram of a driving unit according to the first preferred embodiment.

The detailed structure of the driving unit 34 will now be described with reference to FIG. 7. The driving unit 34 includes an oscillator 61, first and second NOR gates (62a) and (62b), first and second current sources (63a) and (63b) providing an identical current, first and second switches (64a) and (64b), a capacitor 65, a determining unit 66, an AND gate 67, and a latch 68.

The first NOR gate (62a) is disposed to receive the PWM signal and the driving signal as inputs, and outputs a first result that controls the first switch (64a) to switch between open and closed states. The second NOR gate (62b) is disposed to receive an inverted form of the PWM signal and a control signal (which is outputted by the determining unit 66 and which will be described in the succeeding paragraphs) as inputs, and outputs a second result that controls the second switch (64b) to switch between open and closed states. The first and second current sources (63a) and (63b) are coupled respectively to the first and second switches (64a) and (64b) and are disposed between a power source ($V_{dd}$) and ground. The capacitor 65 has an end coupled to a junction of the first and second switches (64a) and (64b), and another end that is grounded.

The determining unit 66 includes an inverting input terminal that is coupled to the capacitor 65, a non-inverting input terminal that is disposed to receive an external reference voltage, and an output terminal that outputs the control signal according to the voltage across the capacitor 65 and the external reference voltage.

The AND gate 67 is disposed to receive the control signal and the PWM signal. The latch 68 is configured to output the driving signal.

In operation, the first switch (64a) is closed when the first to-be-compared signal has a higher voltage than that of the second to-be-compared signal (i.e., the PWM signal is at the low logic level), and the driving signal is at the low logic level. This results in the first NOR gate (62a) receiving two low logic level inputs, and the second NOR gate (62a) receiving at least one high logic level input. The second switch (64b) is open at this time, and the capacitor 65 is charged in a constant current charging mode by the first current source (63a).

On the other hand, the second switch (64b) is closed when the voltage of the first to-be-compared signal is not higher than that of the second to-be-compared signal, (i.e., the PWM signal is at the high logic level). The capacitor 65 subsequently discharges in a constant current discharging mode through the second current source (63b).

When the capacitor 65 has discharged to a voltage not higher than the external reference voltage, the control signal outputted by the determining unit 66 transitions from the low logic level to the high logic level, subsequently causing the driving signal to transition from the low logic level to the high logic level.

An output terminal of the AND gate 67 is coupled to a set terminal of the latch 68. When both the control signal and the PWM signal are at the high logic level, the set terminal of the latch 68 receives a high logic level input. As a result, the latch 68 is said to be "set" by the AND gate 67 and the driving signal transitions from the low logic level to the high logic level when the AND gate 67 outputs a high logic level voltage.

The oscillator 61 is disposed to provide a clock signal, which is in the form of a pulse, to a reset terminal of the latch 68. The driving signal outputted by the latch 68 remains in the high logic level until a rising edge of the clock signal is received. As a result, the driving signal transitions from the high logic level to the low logic level. That is to say, the latch 68 is "reset" by the clock signal. It is noted that a frequency of the clock signal is much larger than that of the AC power source ($V_{ac}$).

FIG. 6 illustrates waveforms of various signals during operation of the power converter 100. In particular, the time period $T_s$ (i.e., time between time points 0 and T13) represents one operation cycle. During the time period $T_{off}$, the first to-be-compared signal first drops from a high voltage at time point 0, and reaches a low voltage at time point T12, before rising toward the high voltage during the time period $T_{on}$.

Firstly, at time point 0, the first to-be-compared signal has a voltage higher than that of the second to-be-compared signal. The PWM signal therefore has the low logic level, causing the output of the AND gate 67 (i.e., the set terminal of the latch 68) to be at the low logic level. The driving signal is also at the low logic level because the latch 68 is not "set". Since both the PWM signal and the driving signal are at the low logic level, the first switch (64a) is closed, while the second switch (64b) is open. As a result, the capacitor 65 is in the constant current charging mode, and the voltage across the capacitor 65 increases with time. Such an increase renders the voltage across the capacitor 65 to be higher than the external reference voltage, and subsequently the control signal is at the low logic level.

As described above, during time period $T_{off}$, the second to-be-compared signal increases as well. At the time point the voltage of the second to-be-compared signal becomes higher than that of the first to-be-compared signal, the PWM signal transitions to the high logic level, causing the first switch (64a) to open and the second switch (64b) to close. The capacitor 65 thus discharges in the constant current discharging mode, and the voltage across the capacitor 65 decreases with time. While the voltage across the capacitor 65 is still higher than the external reference voltage, the control signal and the driving signal remain at the low logic level.

At time point T12, the voltage across the capacitor 65 drops to be lower than the external reference voltage, and the control signal transitions to the high logic level. Since the PWM signal is also at the high logic level, the set terminal of the latch 68 receives a high logic level input, and the driving signal also transitions to the high logic level.

The high logic level driving signal in turn causes the capacitor 55 of the ramp generator 323 to discharge, and the voltage across the capacitor 55 decreases rapidly. When the voltage across the capacitor 55 (i.e., the second to-be-compared signal) is lower than that of the first to-be-compared signal, the PWM signal transitions to the low logic level. At this time point, both the control signal and the driving signal are at the high logic level, and the first and second switches (64a) and (64b) are both open. As a result, the capacitor 65 is neither charging nor discharging, and the voltage across the capacitor 65 remains constant (slightly lower than that of the external reference voltage).

Then, at time point T13, a rising edge of the clock signal occurs and "resets" the latch 68. In response, the driving signal transitions to the low logic level, which closes the first switch (64a). The capacitor 65 enters the constant current charging mode again, starting another operation cycle.

It can be appreciated that, the capacitor 65 is in the constant current charging mode when the first to-be-compared signal has a higher voltage than that of the second to-be-compared signal and the driving signal is at the low logic level, and is in the constant current discharging mode when the voltage of the first to-be-compared signal is not higher than that of the second to-be-compared signal. Since the first and second current sources (63a) and (63b) provide an identical current, the time required for the capacitor 65 to charge from the external reference voltage to a specific voltage is the same as the time required for the capacitor 65 to discharge from the specific voltage to the external reference voltage. It can be then seen that the time period 0-T11 is equal to the time period T11-T12.

Moreover, in this embodiment, the rising edge of the driving signal is determined with reference to the comparison result from the comparator 33. The falling edge of the driving signal is determined with reference to the clock signal.

During the time period $T_{off}$, the first to-be-compared signal is decreasing at a rate related to $(V_o-V_{rec})/L$, where (L) represents the inductance of the inductor 22. This rate can be considered constant, since change of the rectified signal ($V_{rec}$) during the time period $T_{off}$ is considered negligible attributed to the frequency of the driving signal being much larger than that of the AC power source.

On the other hand, during the rising stage of the second to-be-compared signal, the capacitor 55 is in the constant charging mode. It can be seen that, at the time point 11 where the first and second to-be-compared signals are identical, the first to-be-compared signal has a voltage that is a mean value of the high and low peaks thereof. Therefore, the configuration of the PFC 200 may be considered as an average-current-mode control configuration.

The driving signal in this embodiment has a duty cycle of $(T_{on}/T_s)$. The relationship between the rectified signal ($V_{rec}$) and the output voltage ($V_o$) can be expressed by the following equation (1).

$$\frac{V_{rec}}{V_o} = \frac{T_{OFF}}{T_S} = \frac{T_S - T_{ON}}{T_S} \quad (1)$$

An average current flowing through the inductor 22 $i_{L,avg}$ can be expressed by the following equation (2).

$$i_{L,avg} = \frac{V_{55}}{R_{312}} = \frac{k'V_{322}}{R_{312}} \cdot \frac{T_{OFF}}{2T_S} = \frac{k'V_{322}}{2R_{312}} \cdot \frac{V_{rec}}{V_o} \quad (2)$$

Where $V_{55}$ represents the second to-be-compared signal (voltage across the capacitor 55), $V_{322}$ represents the amplifier output signal (output of the error amplifier 322), $R_{312}$ represents the resistance of the resistor 312, and k' is a parameter that is equal to $(T_s/(R_{53}C_{55}))$.

It can be seen from equation (2) that the current flowing through the inductor 22 does not contain a harmonic wave component. By eliminating the harmonic wave component, the corresponding power factor of the power converter 100 can be thus improved.

A peak-to-peak value of the current flowing through the inductor 22 $\Delta i_L$, can be expressed by the following equation (3).

$$\Delta i_L = \frac{V_{rec}}{L_{22}} \cdot T_{ON} = \frac{V_{rec}}{L_{22}} \cdot T_S\left(1 - \frac{V_{rec}}{V_o}\right) = \frac{T_S}{L_{22}}V_{rec} - \frac{T_S}{L_{22}} \cdot \frac{V_{rec}^2}{V_o} \quad (3)$$

Where, $L_{22}$ represents the inductance of the inductor 22. Correspondingly, a peak value and valley value of the current flowing through the inductor 22, $i_{L,valley}$ and $i_{L,peak}$, can be expressed by the following equations (4) and (5), respectively.

$$i_{L,valley} = \left(\frac{k'V_{322}}{2R_{312}V_o} - \frac{T_S}{2L_{22}}\right)V_{rec} + \frac{T_S}{2L_{22}} \cdot \frac{V_{rec}^2}{V_o} \quad (4)$$

$$i_{L,peak} = \left(\frac{k'V_{322}}{2R_{312}V_o} + \frac{T_S}{2L_{22}}\right)V_{rec} - \frac{T_S}{2L_{22}} \cdot \frac{V_{rec}^2}{V_o} \quad (5)$$

A relationship between the parameter (k') and the second to-be-compared signal can be expressed by the following equation (6).

$$V_{55} = \frac{V_{322}}{R_{53}} \cdot \frac{T_{OFF}}{2C_{55}} = \frac{T_S}{R_{53}C_{55}} \cdot \frac{V_{322}T_{OFF}}{2T_S} = k' \cdot \frac{V_{322}T_{OFF}}{2T_S} \quad (6)$$

Figure 8:
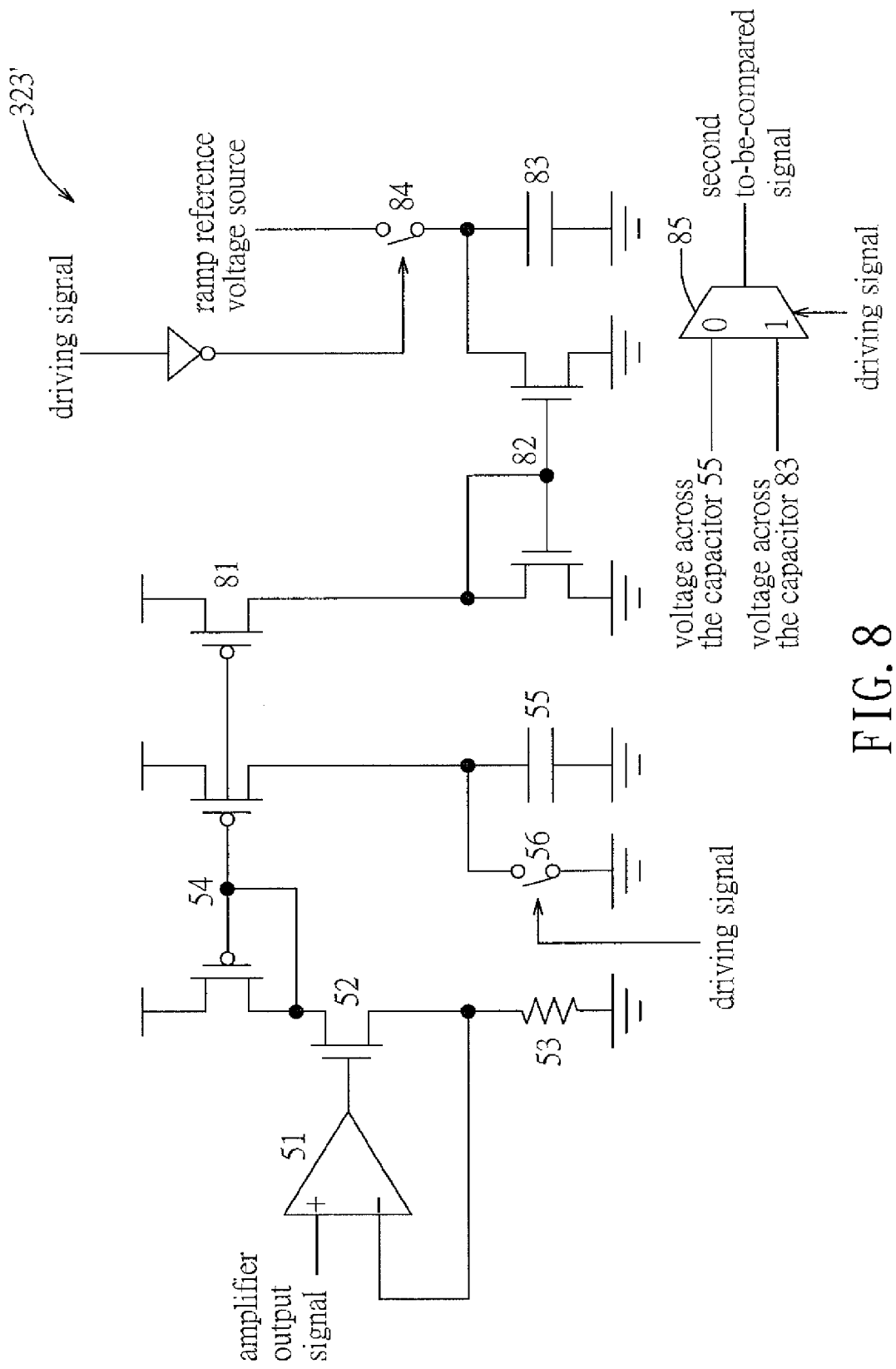
FIG. 8 is a circuit diagram of the ramp generator according to a second preferred embodiment.
Figure 9:
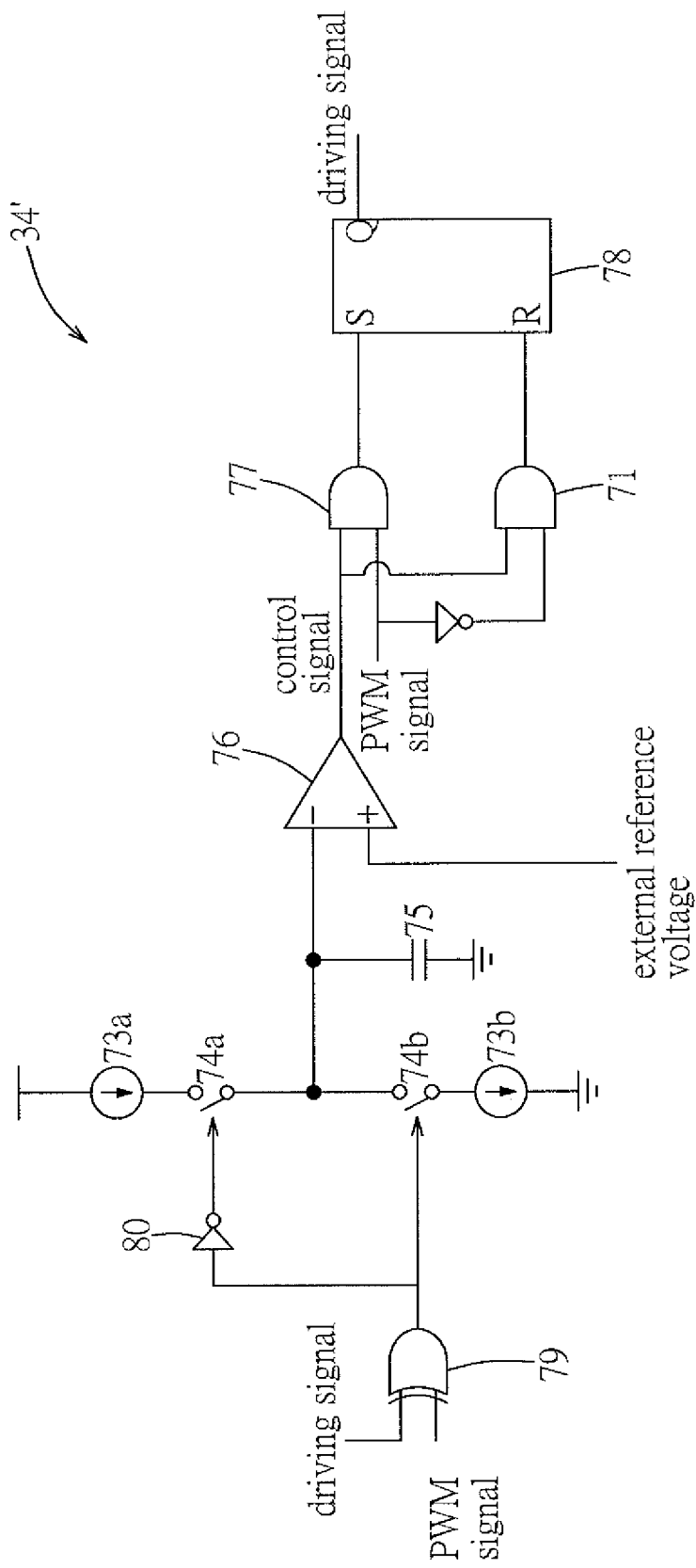
FIG. 9 is a circuit diagram of the driving unit according to the second preferred embodiment.

As shown in FIGS. 8 and 9, the second preferred embodiment of the power converter 100 according to the present invention has a structure similar to that of the first embodiment. The main differences between this embodiment and the previous embodiment reside in the configurations of the ramp generator 323' and the driving unit 34', the detailed structure of which will now be described.

Referring to FIG. 8, the ramp generator 323' includes an OP-AMP 51', a first transistor 52', a resistor 53', a first current mirror 54', a first capacitor 55', a first switch 56', a second transistor 81, a second current mirror 82, a second capacitor 83, a second switch 84, and a multiplexer (MUX) 85.

The OP-AMP 51' has an inverting input terminal, a non-inverting input terminal that is disposed to receive the amplifier output signal, and an output terminal. The first transistor 52' has a control terminal coupled to the output terminal of the OP-AMP 51', a first terminal, and a second terminal coupled to the inverting input terminal of the OP-AMP 51'. Therefore, the OP-AMP 51' is configured to control conduction of the first transistor 52' according to the amplifier output signal, which is generated according to the output voltage ($V_o$). The resistor 53' has one end coupled to the inverting input terminal of the OP-AMP 51' and the second terminal of the first transistor 52'.

The first current mirror 54' has an input terminal coupled to the first terminal of the first transistor 52', and an output terminal. The first current mirror 54' is configured to provide a first mirrored current corresponding to a current at the input terminal thereof, when the first transistor 52' conducts.

The first capacitor 55' is coupled to the output terminal of the first current mirror 54'. The first switch 56 is coupled across the first capacitor 55', and is controlled by the driving voltage to switch between open and closed states.

The second transistor 81 has a control terminal coupled to the first current mirror 54', a first terminal, and a second terminal. The second current mirror 82 has an input terminal coupled to the second terminal of the second transistor 81, and an output terminal.

The second capacitor 83 is coupled to the output terminal of the second current mirror 82. The second switch 84 is disposed to connect and disconnect the output terminal of the second current mirror 82 to a ramp reference voltage source, and is controlled by an inverted form of the driving signal to switch between open and closed states.

The MUX 85 includes two input terminals disposed to respectively receive a voltage across the first capacitor 55' and a voltage across the second capacitor 83, a select terminal disposed to receive the driving signal, and an output terminal that outputs the second to-be-compared signal, which is selected from one of the voltages across the first and second capacitors 55' and 83.

In such a configuration, the MUX 85 is configured to cause the second to-be-compared signal to track a voltage across the first capacitor 55' when the driving signal is at the low logic level, and to track a voltage across the second capacitor 83 when the driving signal is at the high logic level.

When the driving signal is at the low logic level, the first switch 56' is configured to open to enable charging of the first capacitor 55' by the first mirrored current. The second transistor 81 is disposed to provide the first mirrored current to the input terminal of the second current mirror 82. Subsequently, the second current mirror 82 is configured to provide a second mirrored current corresponding to the first mirrored current.

When the driving signal is at the high logic level, the second switch 86 is configured to open to enable discharging of the second capacitor 83.

Referring to FIG. 9, the driving unit 34' includes an XOR gate 79, an inverter 80, first and second current sources (73a) and (73b) providing an identical current, first and second switches (74a) and (74b), a capacitor 75, a determining unit 76, a first AND gate 77, a second AND gate 77, and a flip-flop 78.

The XOR gate 79 has two input terminals disposed to receive the driving signal and the PWM signal, respectively. The output of the XOR gate 79 and an inverted form thereof are for controlling the second and first switches (74b) and (74a), respectively.

The first AND gate 77 is disposed to receive the control signal and the PWM signal, while the second AND gate 71 is disposed to receive the control signal and an inverted form of the PWM signal. The flip-flop 78 has a set terminal disposed to receive the output of the first AND gate 77, and a reset terminal disposed to receive the output of the second AND gate 71.

Figure 10:
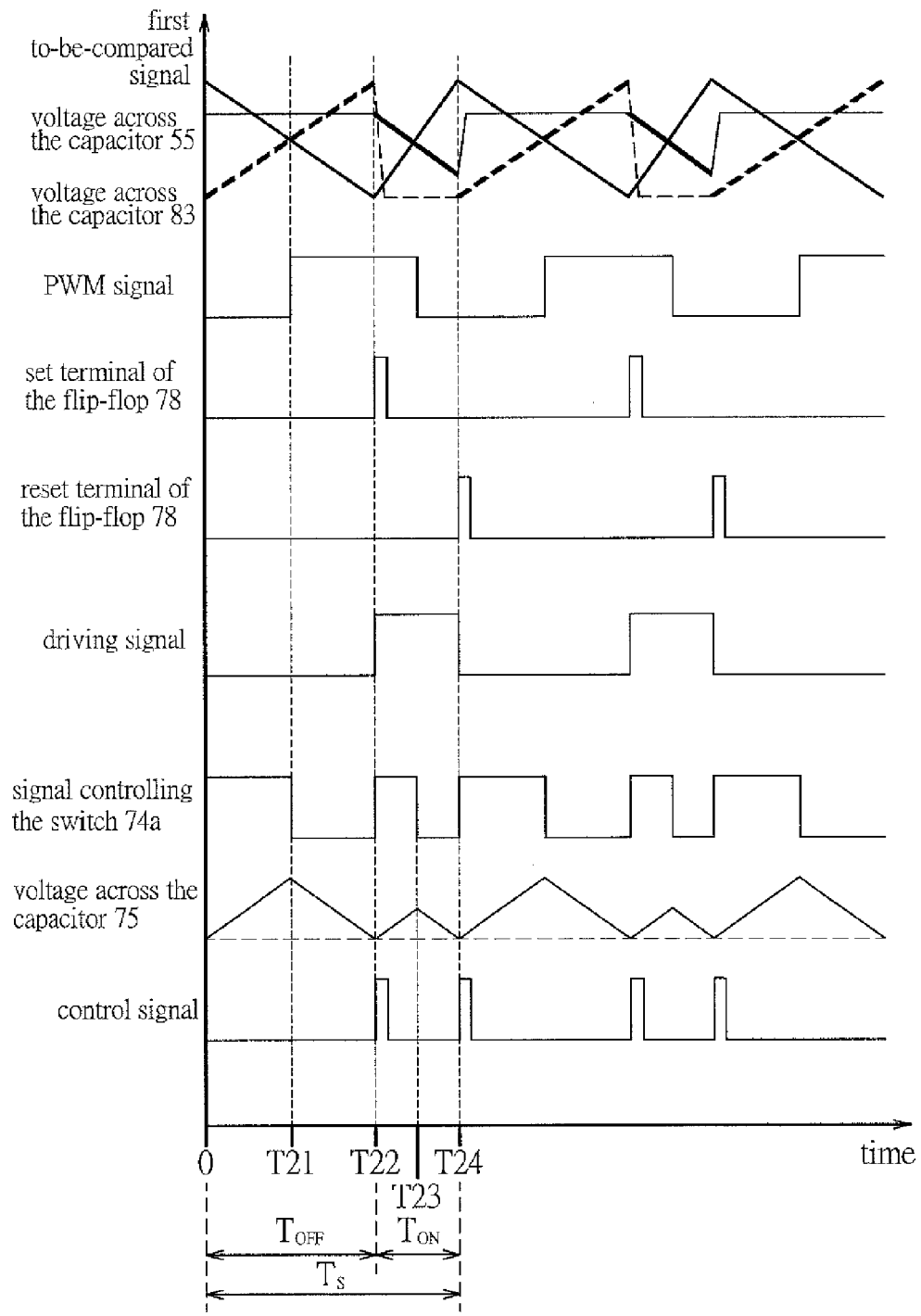
FIG. 10 is a timing diagram illustrating states of various signals within the power converter, according to the second preferred embodiment.

FIG. 10 illustrates waveforms of various signals during operation of the power converter 100 in this embodiment. In particular, the time period $T_s$ (i.e., time between time points 0 and T24) represents one operation cycle. The waveform of the first to-be-compared signal is similar to that depicted in FIG. 6.

During the time period $T_{off}$, the driving signal is at the low logic level, and the inverted form of the driving signal controls the second switch 84 to close. The second capacitor 83 is fully charged, such that the voltage across the second capacitor 83 is constant as long as the driving signal remains at the low logic level. In the meantime, the first switch 56' is open, the first capacitor 55' is in the constant current charging mode, and the voltage across the first capacitor 55', which is selected by the MUX 85 to serve as the second to-be-compared signal, increases.

At time point 0, both the PWM signal and the driving signal are at the low logic level, so that the XOR gate 79 outputs a low logic level output, thereby closing the first switch (74a) and opening the second switch (74b). This places the capacitor 75 in the constant current charging mode, and the voltage across the capacitor 75 increases until time point T21, at which time the PWM signal transitions to the high logic level.

At time point T22, the capacitor 75 has discharged to the external reference voltage ($V_{ref}$), and the control signal transitions to the high logic level. This triggers the driving signal to transition to the high voltage level, and in turn affects states of the first switch 56', the second switch 84, the MUX 85, and the XOR gate 79. As a result, both the first capacitor 55' and the second capacitor 83 discharge, the MUX 85 selects the voltage across the second capacitor 83 to serve as the second to-be-compared signal, and the XOR 79 outputs a low logic level output, thereby closing the first switch (74a) and opening the second switch (74b).

At time point T23, the voltage across the second capacitor 83 drops to the first to-be-compared signal, and the PWM signal transitions to the low logic level. The XOR gate 79 outputs a high logic level output, thereby opening the first switch (74a) and closing the second switch (74b), and causing the capacitor 75 to discharge.

At time point T24, the capacitor 75 has discharged to the external reference voltage ($V_{ref}$), and the control signal transitions to the high logic level. Combined with a low logic level PWM signal, the second AND gate 71 provides a high logic level output to the reset terminal of the flip-flop 78, controlling the flip-flop 78 to output a low logic level driving signal. The MUX 85 now selects the voltage across the first capacitor 55' as the second to-be-compared signal. Afterward, another operation cycle begins.

It is noted that, by employing the second AND gate 71 to provide the reset signal to the flip-flop 78, the oscillator 61 in the first embodiment can be omitted.

The second preferred embodiment has the same advantages as those of the first preferred embodiment.

In embodiments described herein, the rectifier 1 is embodied as a bridge rectifier. However, in other embodiments, other implementations of full-wave rectifier or half-wave rectifiers may be employed.

In embodiments described herein, the power converter is embodied as a boost converter. However, in other embodiments, the power converter may be configured for use as a buck converter or a buck-boost converter.

In embodiments described herein, each of the transistors 21, 52 and 52' is embodied as an N-channel metal-oxide-semiconductor field-effect transistor (NMOS), which conducts when the signal provided to the control terminal thereof is at the high logic level. It may be appreciated by those skilled in art that P-channel MOS may be employed in other embodiments.

To sum up, the power converter 100 of the present invention is able to achieve the power factor correction effect without adopting the relatively complex computing circuit or performing numerous arithmetic operations. With the configuration described above, it can be seen that the harmonic distortion in the current through the inductor 22 can be eliminated, thereby effectively improving the performance of the power converter.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power converter comprising:
 a rectifier to be coupled to an alternating current (AC) power source and configured to output a rectified signal; and
 a power factor corrector (PFC) including
  a correcting circuit coupled to said rectifier for receiving the rectified signal therefrom and configured to generate an output voltage based on the rectified signal and a driving signal, wherein said correcting circuit includes an inductor through which current flowing from said rectifier flows, and a transistor that is controlled by the driving signal to switch between conducting and non-conducting states to control in turn energy storing and energy discharging by said inductor, and
  a control circuit configured to generate a first to-be-compared signal based on the rectified signal, to generate a second to-be-compared signal based on the output voltage, to compare the first and second to-be-compared signals, and to generate the driving signal based on a result of comparison performed thereby,
 wherein said control circuit includes:
  an input unit that generates the first to-be-compared signal based on the rectified signal;
  a signal generator that generates the second to-be-compared signal based on the output voltage;
  a comparator that compares the first and second to-be-compared signals and that generates a comparison result; and
  a driving unit that generates the driving signal in a form of a pulse, wherein a transition edge of the driving signal is determined with reference to the comparison result from said comparator.

2. The power converter of claim 1, wherein said driving unit includes a capacitor;
 said driving unit is configured to charge said capacitor in a constant current charging mode when the first to-be-compared signal has a higher voltage than that of the second to-be-compared signal and the driving signal is at a low logic level;
 said driving unit is further configured to subsequently cause said capacitor to discharge in a constant current discharging mode when the voltage of the first to-be-compared signal is not higher than that of the second to-be-compared signal; and
 said driving unit is further configured to subsequently cause the driving signal to transition from the low logic level to a high logic level when said capacitor has discharged to an external reference voltage.

3. The power converter of claim 2, wherein said driving unit further includes:
 a determining unit configured to cause a control signal to transition from a low logic level to a high logic level when said capacitor is discharged such that a voltage across said capacitor is not higher than the external reference voltage;
 an AND gate disposed to receive the control signal and the comparison result from said comparator; and
 a latch that outputs the driving signal and that is set by said AND gate so that the driving signal transitions from the low logic level to the high logic level when the control signal is at the high logic level and the voltage of the first to-be-compared signal is not higher than that of the second to-be-compared signal;

said latch being configured to be reset by a clock signal so that the driving signal transitions from the high logic level to the low logic level.

4. The power converter of claim 1, wherein said signal generator includes:
 an operational amplifier (OP-AMP) having an inverting input terminal, a non-inverting input terminal, and an output terminal;
 a transistor having a control terminal coupled to said output terminal of said OP-AMP, a first terminal, and a second terminal coupled to said inverting input terminal of said OP-AMP;
 a current mirror having an input terminal coupled to said first terminal of said transistor, and an output terminal;
 a capacitor coupled to said output terminal of said current mirror, wherein a voltage across said capacitor serves as the second to-be-compared signal; and
 a switch coupled across said capacitor;
 wherein said OP-AMP is configured to control conduction of said transistor according to the output voltage;
 wherein said current mirror is configured to provide a mirrored current corresponding to a current at said input terminal thereof when said transistor conducts;
 wherein said switch is configured to open when the driving signal is at the low logic level to enable charging of said capacitor by the mirrored current; and
 wherein said switch is configured to close when the driving signal is at the high logic level to enable discharging of said capacitor.

5. The power converter of claim 4, wherein said signal generator further includes:
 a voltage divider configured to output a divided output voltage divided from the output voltage; and
 an error amplifier configured to compare the divided output voltage with an amplifier reference voltage and to generate an amplifier output signal according to a result of comparison performed thereby, the amplifier output signal being provided to said non-inverting input terminal of said OP-AMP to configure said OP-AMP to control conduction of said transistor according to the amplifier output signal.

6. The power converter of claim 1, wherein said driving unit includes a capacitor;
 said driving unit is configured to charge said capacitor in a constant current charging mode when the driving signal is at a high logic level and the first to-be-compared signal has a lower voltage than that of the second to-be-compared signal;
 said driving unit is further configured to subsequently cause said capacitor to discharge in a constant current discharging mode when the voltage of the first to-be-compared signal is higher than that of the second to-be-compared signal; and
 said driving unit is further configured to subsequently cause the driving signal to transition from the high logic level to a low logic level when said capacitor has discharged to an external reference voltage.

7. The power converter of claim 6, wherein said driving unit further includes:
 a determining unit configured to cause a control signal to transition from a low logic level to a high logic level when said capacitor is discharged such that a voltage across said capacitor is not higher than the external reference voltage;
 a first AND gate disposed to receive the control signal and the comparison result from said comparator;

a second AND gate disposed to receive the control signal and an inverted form of the comparison result from said comparator; and a latch that outputs the driving signal and that is set by said first AND gate so that the driving signal transitions from the low logic level to the high logic level when the control signal is at the high logic level and the voltage of the first to-be-compared signal is not higher than that of the second to-be-compared signal;

said latch being configured to be reset by said second AND gate so that the driving signal transitions from the high logic level to the low logic level when the control signal is at the high logic level and the voltage of the first to-be-compared signal is higher than that of the second to-be-compared signal.

8. The power converter of claim 1, wherein said signal generator includes:

an operational amplifier (OP-AMP) having an inverting input terminal, a non-inverting input terminal, and an output terminal;

a first transistor having a control terminal coupled to said output terminal of said OP-AMP, a first terminal, and a second terminal coupled to said inverting input terminal of said OP-AMP;

a first current mirror having an input terminal coupled to said first terminal of said first transistor, and an output terminal;

a first capacitor coupled to said output terminal of said first current mirror;

a first switch coupled across said first capacitor;

a second transistor having a control terminal coupled to said first current mirror, a first terminal, and a second terminal;

a second current mirror having an input terminal coupled to said second terminal of said second transistor, and an output terminal;

a second capacitor coupled to said output terminal of said second current mirror;

a second switch disposed to connect and disconnect said output terminal of said second current mirror to a ramp reference voltage source; and a multiplexer (MUX) that is configured to cause the second to-be-compared signal to track a voltage across said first capacitor when the driving signal is at the low logic level, and to track a voltage across said second capacitor when the driving signal is at the high logic level;

wherein said OP-AMP is configured to control conduction of said first transistor according to the output voltage;

wherein said first current mirror is configured to provide a first mirrored current corresponding to a current at said input terminal thereof when said first transistor conducts;

wherein said first switch is configured to open when the driving signal is at the low logic level to enable charging of said first capacitor by the first mirrored current;

wherein said second transistor is disposed to provide the first mirrored current to said input terminal of said second current mirror;

wherein said second current mirror is configured to provide a second mirrored current corresponding to the first mirrored current;

wherein said second switch is configured to open when the driving signal is at the high logic level to enable discharging of said second capacitor.

9. The power converter of claim 8, wherein said signal generator further includes:

a voltage divider configured to output a divided output voltage from the output voltage; and an error amplifier configured to compare the divided output voltage with an amplifier reference voltage and to generate an amplifier output signal according to a result of comparison performed thereby, the amplifier output signal being provided to said non-inverting input terminal of said OP-AMP to configure said OP-AMP to control conduction of said first transistor according to the amplifier output signal.

10. A power factor corrector (PFC) for use with a rectifier that outputs a rectified signal, said PFC comprising:

a correcting circuit for receiving the rectified signal from the rectifier and configured to generate an output voltage based on the rectified signal and a driving signal, wherein said correcting circuit includes an inductor through which current flowing from the rectifier flows, and a transistor that is controlled by the driving signal to switch between conducting and non-conducting states to control in turn energy storing and energy discharging by said inductor; and a control circuit configured to generate a first to-be-compared signal based on the rectified signal, to generate a second to-be-compared signal based on the output voltage, to compare the first and second to-be-compared signals, and to generate the driving signal based on a result of comparison performed thereby, wherein said control circuit includes:

an input unit that generates the first to-be-compared signal based on the rectified signal;

a signal generator that generates the second to-be-compared signal based on the output voltage;

a comparator that compares the first and second to-be-compared signals and that generates a comparison result; and a driving unit that generates the driving signal in a form of a pulse, wherein a transition edge of the driving signal is determined with reference to the comparison result from said comparator.

11. The PFC of claim 10, wherein said driving unit includes a capacitor;

said driving unit is configured to charge said capacitor in a constant current charging mode when the first to-be-compared signal has a higher voltage than that of the second to-be-compared signal and the driving signal is at a low logic level;

said driving unit is further configured to subsequently cause said capacitor to discharge in a constant current discharging mode when the voltage of the first to-be-compared signal is not higher than that of the second to-be-compared signal; and said driving unit is further configured to subsequently cause the driving signal to transition from the low logic level to a high logic level when said capacitor has discharged to an external reference voltage.

12. The PFC of claim 11, wherein said driving unit further includes:

a determining unit configured to cause a control signal to transition from a low logic level to a high logic level when said capacitor is discharged such that a voltage across said capacitor is not higher than the external reference voltage;

an AND gate disposed to receive the control signal and the comparison result from said comparator; and a latch that outputs the driving signal and that is set by said AND gate so that the driving signal transitions from the low logic level to the high logic level when the control signal is at the high logic level and the voltage of the first to-be-compared signal is not higher than that of the second to-be-compared signal;

said latch being configured to be reset by a clock signal so that the driving signal transitions from the high logic level to the low logic level.

13. The PFC of claim 10, wherein said signal generator includes:
   an operational amplifier (OP-AMP) having an inverting input terminal, a non-inverting input terminal, and an output terminal;
   a transistor having a control terminal coupled to said output terminal of said OP-AMP, a first terminal, and a second terminal coupled to said inverting input terminal of said OP-AMP;
   a current mirror having an input terminal coupled to said first terminal of said transistor, and an output terminal;
   a capacitor coupled to said output terminal of said current mirror, wherein a voltage across said capacitor serves as the second to-be-compared signal; and
   a switch coupled across said capacitor;
   wherein said OP-AMP is configured to control conduction of said transistor according to the output voltage;
   wherein said current mirror is configured to provide a mirrored current corresponding to a current at said input terminal thereof when said transistor conducts;
   wherein said switch is configured to open when the driving signal is at the low logic level to enable charging of said capacitor by the mirrored current; and
   wherein said switch is configured to close when the driving signal is at the high logic level to enable discharging of said capacitor.

14. The PFC of claim 13, wherein said signal generator further includes:
   a voltage divider configured to output a divided output voltage divided from the output voltage; and
   an error amplifier configured to compare the divided output voltage with an amplifier reference voltage and to generate an amplifier output signal according to a result of comparison performed thereby, the amplifier output signal being provided to said non-inverting input terminal of said OP-AMP to configure said OP-AMP to control conduction of said transistor according to the amplifier output signal.

15. The PFC of claim 10, wherein said driving unit includes a capacitor;
   said driving unit is configured to charge said capacitor in a constant current charging mode when the driving signal is at a high logic level and the first to-be-compared signal has a lower voltage than that of the second to-be-compared signal;
   said driving unit is further configured to subsequently cause said capacitor to discharge in a constant current discharging mode when the voltage of the first to-be-compared signal is higher than that of the second to-be-compared signal; and
   said driving unit is further configured to subsequently cause the driving signal to transition from the high logic level to a low logic level when said capacitor has discharged to an external reference voltage.

16. The PFC of claim 15, wherein said driving unit further includes:
   a determining unit configured to cause a control signal to transition from a low logic level to a high logic level when said capacitor is discharged such that a voltage across said capacitor is not higher than the external reference voltage;
   a first AND gate disposed to receive the control signal and the comparison result from said comparator;
   a second AND gate disposed to receive the control signal and an inverted form of the comparison result from said comparator; and
   a latch that outputs the driving signal and that is set by said first AND gate so that the driving signal transitions from the low logic level to the high logic level when the control signal is at the high logic level and the voltage of the first to-be-compared signal is not higher than that of the second to-be-compared signal;
   said latch being configured to be reset by said second AND gate so that the driving signal transitions from the high logic level to the low logic level when the control signal is at the high logic level and the voltage of the first to-be-compared signal is higher than that of the second to-be-compared signal.

17. The PFC of claim 10, wherein said signal generator includes:
   an operational amplifier (OP-AMP) having an inverting input terminal, a non-inverting input terminal, and an output terminal;
   a first transistor having a control terminal coupled to said output terminal of said OP-AMP, a first terminal, and a second terminal coupled to said inverting input terminal of said OP-AMP;
   a first current mirror having an input terminal coupled to said first terminal of said first transistor, and an output terminal;
   a first capacitor coupled to said output terminal of said first current mirror;
   a first switch coupled across said first capacitor;
   a second transistor having a control terminal coupled to said first current minor, a first terminal, and a second terminal;
   a second current mirror having an input terminal coupled to said second terminal of said second transistor, and an output terminal;
   a second capacitor coupled to said output terminal of said second current mirror;
   a second switch disposed to connect and disconnect said output terminal of said second current mirror to a ramp reference voltage source; and
   a multiplexer (MUX) that is configured to cause the second to-be-compared signal to track a voltage across said first capacitor when the driving signal is at the low logic level, and to track a voltage across said second capacitor when the driving signal is at the high logic level;
   wherein said OP-AMP is configured to control conduction of said first transistor according to the output voltage;
   wherein said first current mirror is configured to provide a first mirrored current corresponding to a current at said input terminal thereof when said first transistor conducts;
   wherein said first switch is configured to open when the driving signal is at the low logic level to enable charging of said first capacitor by the first mirrored current;
   wherein said second transistor is disposed to provide the first mirrored current to said input terminal of said second current mirror;
   wherein said second current mirror is configured to provide a second mirrored current corresponding to the first mirrored current;
   wherein said second switch is configured to open when the driving signal is at the high logic level to enable discharging of said second capacitor.

18. The PFC of claim 17, wherein said signal generator further includes:
- a voltage divider configured to output a divided output voltage from the output voltage; and
- an error amplifier configured to compare the divided output voltage with an amplifier reference voltage and to generate an amplifier output signal according to a result of comparison performed thereby, the amplifier output signal being provided to said non-inverting input terminal of said OP-AMP to configure said OP-AMP to control conduction of said first transistor according to the amplifier output signal.

* * * * *